May 2, 1950

R. D. MacDONALD 2,506,372

IDLER ROLLER AND CLEANER ASSEMBLY
FOR USE WITH BELT CONVEYERS

Filed Nov. 12, 1947

INVENTOR.
Raymore D. MacDonald
By Albert G. McCaleb
Attorney

May 2, 1950
R. D. MacDONALD
2,506,372
IDLER ROLLER AND CLEANER ASSEMBLY
FOR USE WITH BELT CONVEYERS
Filed Nov. 12, 1947
2 Sheets-Sheet 2
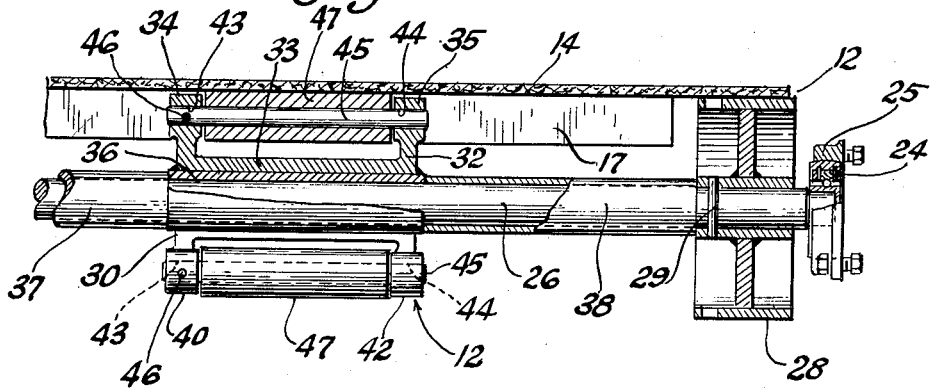
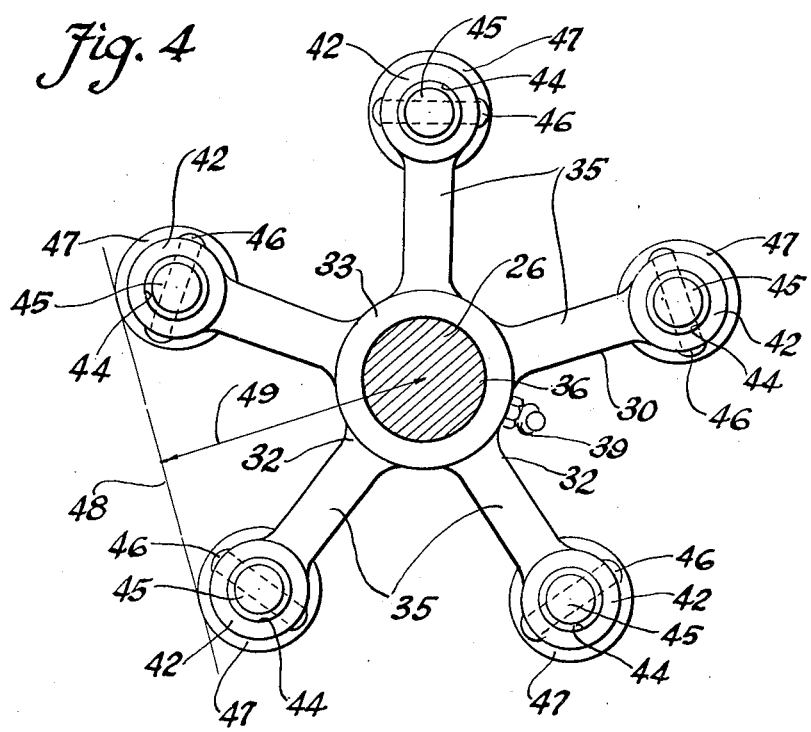
INVENTOR.
Raymore D. MacDonald
By Albert G. McCaleb
Attorney Patented May 2, 1950

2,506,372

UNITED STATES PATENT OFFICE 2,506,372

IDLER ROLLER AND CLEANER ASSEMBLY FOR USE WITH BELT CONVEYERS

Raymore D. MacDonald, La Grange, Ill., assignor to Athey Products Corporation, Chicago, Ill., a corporation of Illinois Application November 12, 1947, Serial No. 785,323

4 Claims. (Cl. 198—230)

This invention relates to idler assemblies adapted to use with belt conveyors and the like for effecting a vibratory or shaking movement of the conveyor belt to loosen and remove material which adheres thereto.

It is an object of my invention to provide an idler roller assembly adapted to use for supporting and effecting periodic vibratory movements of a conveyor belt as the belt moves along its path.

As another object the invention comprehends the provision of an idler roller assembly adapted to use for supporting and shaking the return portion of a cleated endless conveyor belt.

My invention further has within its purview the provision of an idler roller assembly for use with conveyor belts and the like and which embodies coaxially disposed parts spaced laterally of the belt and separately driven by the belt, and one of which parts effects a periodic jarring action upon the belt to loosen adhering material therefrom.

With the foregoing purposes in view, my invention includes an idler roller assembly for supporting and jarring the mid-portion of a conveyor belt or the like, which assembly is supported to be driven by the movements of the belt and has a plurality of small belt engaging rollers carried for independent rotation and in spaced relationship at positions equally spaced from a central axis of rotation; the spacing, leverages and frictional values of the assembly being designed to avoid interference with belt cleats and to effect rotation of the assembly by contact with the belt.

Other objects and advantages of the invention will be apparent from the following description and the accompanying drawings in which similar characters of reference indicate similar parts throughout the several views.

In the two sheets of drawings:

Fig. 3 is a fragmentary front sectional view of the idler roller assembly shown in Figs. 1 and 2 with parts cut away to indicate details of the structure; and Fig. 4 is a side sectional view drawn to an enlarged scale and illustrating a portion of the structure shown in the previously described figures.

Figure 1:
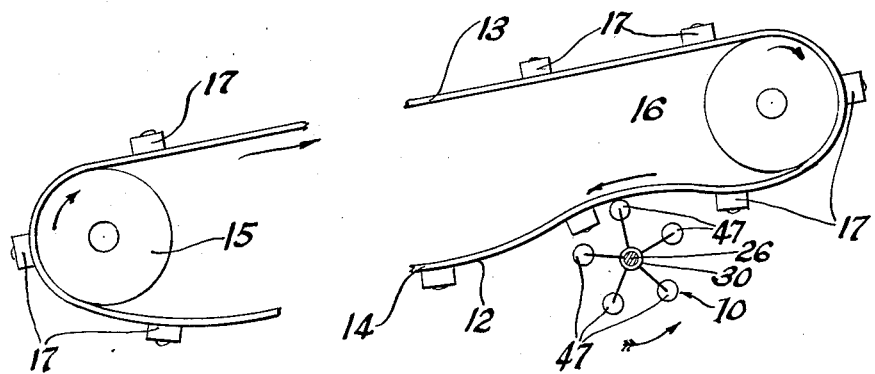
Fig. 1 is a diagrammatic side elevational view depicting the adaptation of a preferred embodiment of my idler roller assembly to the support of the return portion of a conveyor belt.
Figure 2:
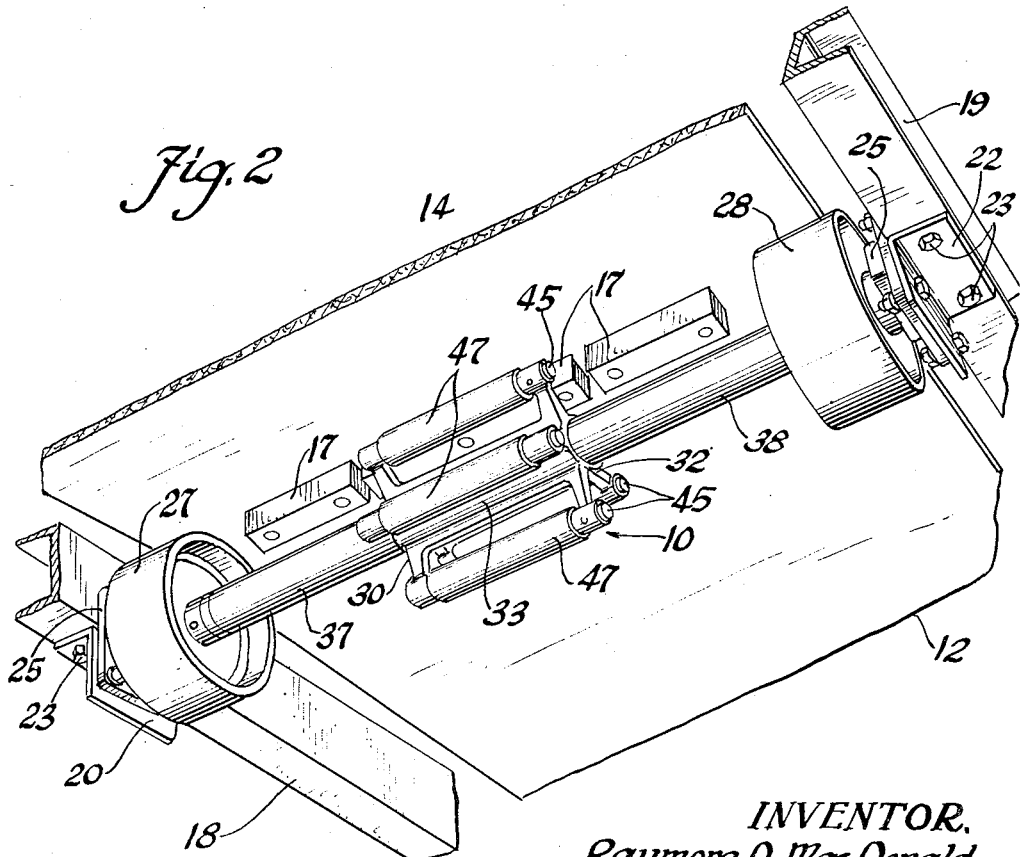
Fig. 2 is a fragmentary perspective view taken from below and to one side of a preferred structural embodiment of the idler roller assembly shown in Fig. 1.

Considered in its more general aspects, my preferred idler roller assembly 10, which is depicted in the accompanying drawings for illustrative purposes, is adapted to the support of, and for imparting vibratory motion to a portion of a conveyor belt 12, as shown in Fig. 1. As depicted in that figure, the conveyor belt 12 has material carrying and return portions 13 and 14 respectively and is supported for movement at its opposite ends by rollers 15 and 16, at least one of which is power driven. In the disclosed embodiment, cleats 17 are secured to the surface of the conveyor belt, which is uppermost in the material conveying portion, to prevent material from sliding downwardly along the belt as the conveyor moves the material upwardly. Whether or not such cleats are utilized, it is particularly desirable for the handling of some materials, such as snow and wet dirt, to provide one or more idler rollers which not only support the return portion of the belt, but which also impart vibratory motion thereto for the purpose of effecting the loosening and removal from the belt of material which has adhered thereto.

The endless conveyor belt 12 is indicated as being typical of such apparatus utilized in loaders and the like. As is usual in such adaptations, supporting frame members, such as 18 and 19, extend longitudinally along the opposite sides of the conveyor belt and are utilized for carrying the supporting rollers and other associated apparatus.

Considering the disclosed structure, and particularly the idler roller assembly in greater detail, brackets 20 and 22 are secured in opposed positions to the frame members 18 and 19 by fastening means such as cap screws 23 and have bearings such as 24 secured in axially aligned positions to their opposed inner surfaces by support rings 25. These bearings provide an antifriction support for a main shaft 26 which is carried thereby and extends laterally across the lower surface of the return portion 14 of the belt in spaced relationship thereto.

At opposite ends of the main shaft 26, substantially cylindrical belt supporting rollers 27 and 28 are mounted on the shaft and drivingly connected thereto by means such as cross pins 29. By preference, and when cleats such as 17 are secured to the belt surface, those cleats terminate inwardly of the side edges of the belt and leave an exposed marginal portion at each side thereof. The rollers 27 and 28 engage and support opposite marginal portions of the belt and are driven by frictional engagement therewith. At its mid-portion, the main shaft 26 carries a roller assembly 30 which includes a support member 32 having a central hub, which, at its opposite ends, has a plurality of radial arms 34 and 35 projecting outwardly therefrom at axially aligned positions. In my preferred structure, the hub 33 and arms 34 and 35 are integrally formed as a unitary casting. The hub 33 has a central axle bore therethrough and carries a sleeve bearing 36 which is journaled for relatively free rotational movement on the mid-portion of the main shaft 26. Spacing sleeves 37 and 38 are mounted on the shaft 26 on opposite sides of the roller assembly 30 to position that assembly longitudinally of the shaft and relative to the support rollers 27 and 28. Being thus located and supported, the roller assembly 30 is rotatable on the shaft 26 independently of the shaft rotation which is effected by the supporting rollers 27 and 28. A grease fitting 39 is desirably provided on the hub 33, as indicated in Fig. 3, for lubricating the bearing surfaces of the shaft and bearing sleeve 36.

At their outer ends, the arms 34 and 35 have enlarged portions 40 and 42 provided with axially aligned bearing bores 43 and 44 respectively, which bearing bores, in axially opposed pairs of the arms, each carry a roller shaft 45. The shafts 45 are secured in place and prevented from rotation relative to the arms by fastening means such as cross pins 46 extending through suitable holes in the enlarged end portions 40 of the arms 34 and their respective roller shafts. A roller 47 is supported for rotary movement on each of the shafts 45 and between the arms 34 and 35 of the support member.

Being an idler, adapted to be driven by contact with the associated conveyor belt, there are certain dimensional and design characteristics which are important to the operation of the device and its self-timed relationship to the cleats 17 on the belt. In the first place, the circumferential distance between adjacent rollers 47 on the roller assembly is sufficient that the cleats 17 pass freely therebetween. Thus, as the belt moves along, engagement of a roller with the side surface of a cleat will merely push the roller assembly along, while engagement of a roller with the surface of a cleat opposite the belt will stop the forward movement of the roller assembly until the cleat has passed into a position between adjacent rollers.

The rollers 47 are of a diameter sufficiently large that their peripheral surfaces are outside the end surfaces of the arms, so that the rollers support the mid-portion of the belt and prevent its engagement with the arms. Since it is the purpose of the roller assembly to set up vibratory motion in the belt to loosen and effect the removal of adhering material therefrom, as well as to support the mid-portion of the belt, the radial distance from the axis of the main shaft 26 to the outer surfaces of the rollers 47 is so related to the perpendicular distance 49 between a tangent such as 48 to adjacent rollers and the axis of the shaft 26 that substantial vibratory motion of the belt is effected. It may be readily appreciated that at times the belt is in a raised position, in engagement with only one roller, while at other times it assumes a lowered position tangent to adjacent rollers. In order that the roller assembly will be revolved to produce the vibratory motion of the belt rather than having the belt ride along on two adjacent rollers 47 without revolving the assembly, it is necessary that the number of arms, the friction between the rollers 47 and their respective shafts and the friction between the bearing sleeve 36 and the main shaft shall be so related as to effect the rotation of the assembly by the frictional contact with the belt surface. From this it may be understood that the friction between the bearing sleeve 36 and the main shaft should be small. The friction between the rollers 47 and their respective shafts may be relatively large in order to reduce the tendency for the belt to ride in a tangent position on two adjacent rollers. Further than this, there must be a compromise reached between the number of arms desirable for producing the desired amount of vibratory motion and the number of arms required to avoid having the belt hold the roller assembly in one position. In the disclosed embodiment of my invention, five equi-angularly spaced arms are used at each end of the support member.

From the foregoing description and reference to the accompanying drawings, it may be understood that I have provided a structure and the design characteristics for an idler roller assembly adapted to be used with conveyor belts and the like, preferably in association with the return portion thereof to provide support for the belt and to effect vibratory motion thereof for the purpose of removing adhering material from the belt. In addition to being driven by an associated belt, the disclosed structure is self-timing when used with a cleated belt.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. An idler roller assembly for use with conveyor belts and the like to be driven by movements of the belt and adapted to set up a vibratory motion in the belt, said assembly comprising a main shaft supported at its ends for substantially free rotation, substantially cylindrical belt supporting rollers mounted on and drivingly connected to opposite end portions of said main shaft at positions for engagement with marginal portions of a belt of predetermined width, a roller assembly carried for relatively free rotation by the mid-portion of the main shaft and including a support member having a central bearing portion at the opposite ends of which a plurality of arms project outwardly in radial directions at axially opposed and equiangularly spaced positions, axially opposed pairs of said arms each having a roller shaft extending therebetween and secured thereto, rollers of relatively small diameter rotatably carried by said roller shafts, and spacing sleeves on the main shaft for locating said roller assembly between said belt supporting rollers, the radial distances from the center of the main shaft to the outer surfaces of the small rollers being at least substantially equal to the radii of the belt supporting rollers.

2. An idler roller assembly as defined in claim 1, and wherein the number of said arms, the friction between said roller shafts and small rollers, and the friction between the main shaft and said support member being so related that said assembly is rotated relative to the main shaft by engagement of said small rollers with the surface of the belt.

3. An idler roller assembly as defined in claim 1, and wherein said radial distance from the center of the main shaft to the outer surfaces of the small rollers is so related to the perpendicular distance from a tangent between the outer surfaces of adjacent small rollers to the axis of the main shaft that substantial belt vibration is produced by movement of the belt in contact with the small rollers.

4. An idler roller assembly as defined in claim 1 for use with a conveyor belt having cleats on the surface thereof, the combination being further characterized by the spacing between adjacent small rollers being sufficient for said cleats to pass freely therebetween.

RAYMORE D. MacDONALD.

REFERENCES CITED

The following references are of record in the file of this patent:

UNITED STATES PATENTS

| Number | Name | Date |
|---|---|---|
| 1,425,791 | Oak | Aug. 15, 1922 |
| 2,216,304 | Thornton | Oct. 1, 1940 |